Nov. 17, 1931.  O. B. GOLDMAN  1,832,380
PRESSURE MEASURING DEVICE
Filed Sept. 4, 1929   2 Sheets-Sheet 1
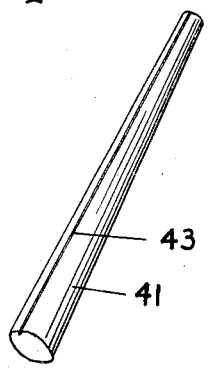
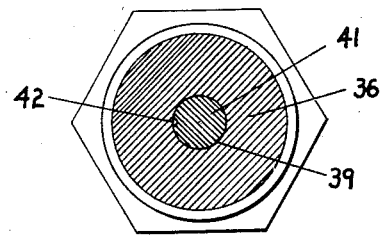
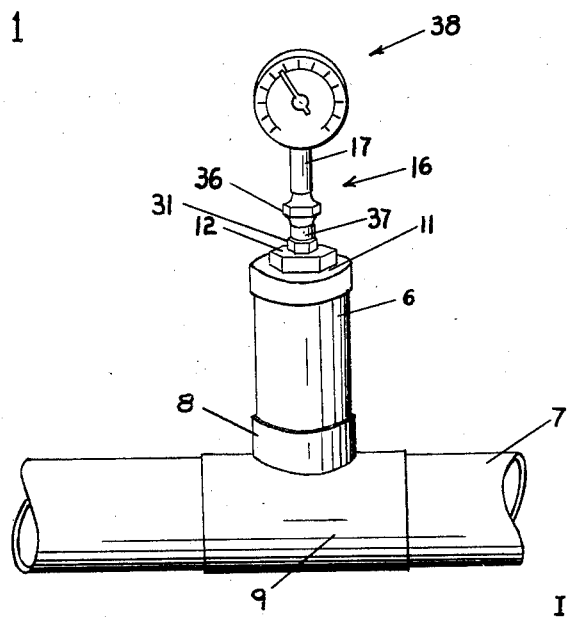
Inventor
Otto B. Goldman
by Hazard and Miller
Attorneys

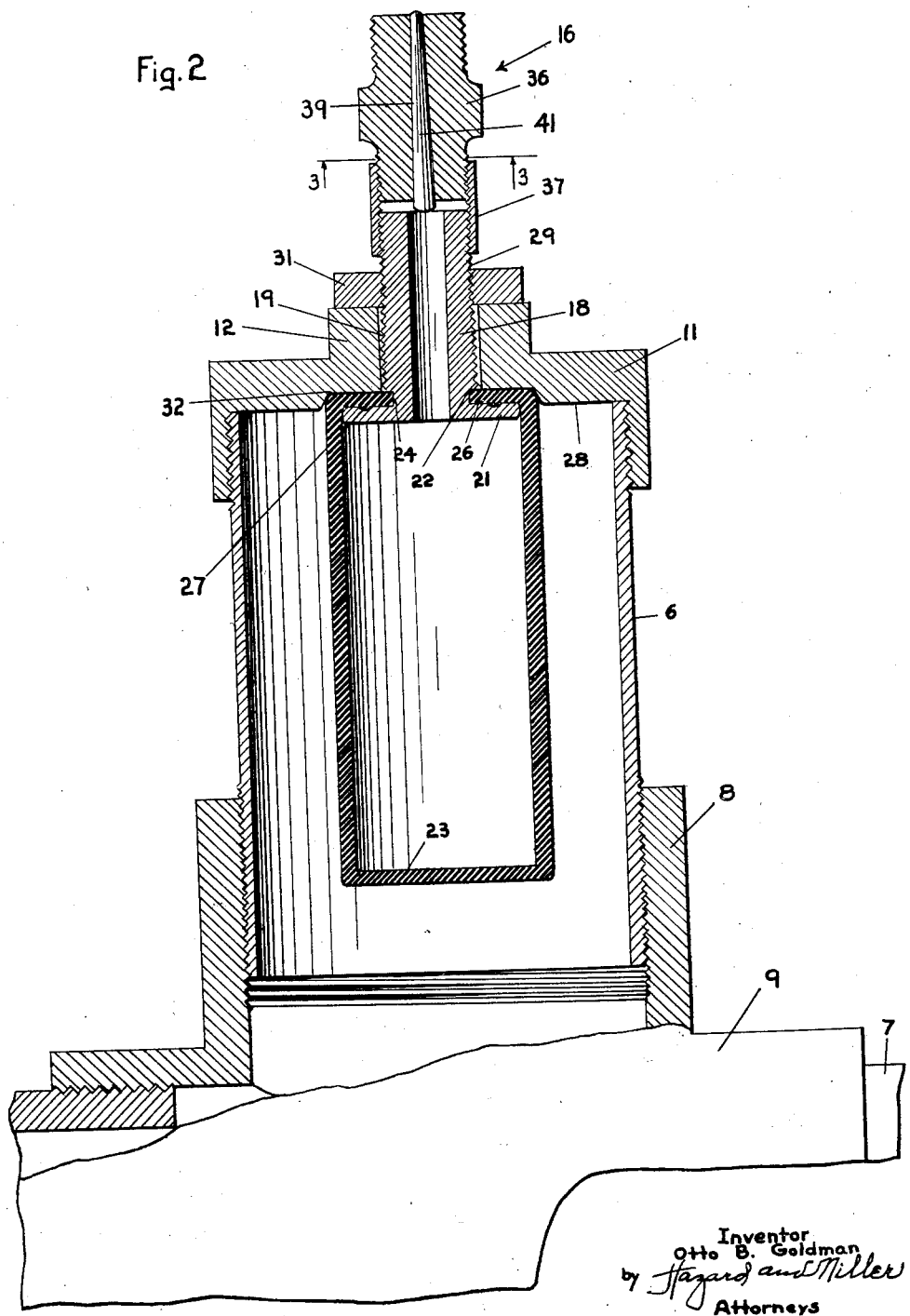

Patented Nov. 17, 1931

1,832,380

UNITED STATES PATENT OFFICE

OTTO B. GOLDMAN, OF LONG BEACH, CALIFORNIA

PRESSURE MEASURING DEVICE

Application filed September 4, 1929. Serial No. 390,379.

This invention relates to instruments for measuring fluid pressure, and has for an object the provision of a pressure measuring instrument capable of measuring by either recording or indicating means the mean pressure of fluid, the pressure of which is subject to continual fluctuation.

With this object in view, the device of the present invention, is particularly adapted for use in conjunction with the circulation fluid system employed in deep well drilling, inasmuch as the "mud" or circulation fluid is ordinarily subjected to relatively high pressure, which pressure however, is not constant but is fluctuating due to the reciprocation of the pump pistons whereby the pressure of the fluid is attained. It is not at all uncommon for the pressure of circulation fluid to fluctuate over a range of more than a thousand pounds per square inch, with the periodicity of the pressure fluctuation being in the neighborhood of one or two seconds, depending upon the number of cylinders of the pump or pumps associated with the circulation system, and the speed at which they are driven. Obviously, this rapid and violent fluctuation of pressure renders it extremely difficult to ascertain the effective pressure of the circulation fluid, because the indicating hand of any gauge responsive to pressure fluctuations within the system, will be subjected to vibration through a distance corresponding to the extent of the pressure fluctuation, making it difficult or impossible to correctly read the instrument. Furthermore, the length of time during which a pressure gauge, either indicating or recording, remains serviceable while subjected to such abuse, is extremely short.

It is for the purpose of overcoming these undesirable conditions associated with deep well drilling, and in fact with any other operation requiring the use of fluid under fluctuating pressure, that the device of the present invention has been designed, this device being capable of imposing upon the measuring means the mean or average pressure.

A further object is the provision of a pressure measuring instrument of the general character described, which is also provided with means for isolating the fluid whose pressure it is desired to ascertain from the fluid within the gauge, and also from the means for dampening the pressure fluctuations.

A further object is the provision of a pressure measuring device as described, which is of an exceedingly simple nature, and yet which is capable of operating with a high degree of efficiency and accuracy, and which may be employed to measure extremely high pressures such as those to which circulation fluid is commonly subjected.

This invention possesses other objects and advantageous features, some of which, with those enumerated, will be set forth in the following description of the invention's particular embodiment which is illustrated in the drawings accompanying and forming a part of the specification.

Referring to the drawings:

Figure 1 is a perspective view in side elevation, of a pressure measuring device incorporating the principles of the present invention;

Fig. 2 is a vertical, medial, sectional view, with the pressure gauge removed and with portions of the Figure broken away to reduce its length;

Fig. 3 is a transverse sectional view taken upon the line 3—3 of Fig. 2, with the direction of view as indicated;

Fig. 4 is a perspective view of the pin employed for dampening the pressure fluctuations.

In terms of broad inclusion, the pressure measuring device of the present invention comprises a housing adapted to be connected into a container, the pressure of whose contents it is desired to ascertain, in such a manner that the interior of the housing is in communication with the interior of the container. A suitable pressure measuring instrument such as an indicating or a recording gauge, is coupled to the housing; and means are disposed within the housing for preventing intermingling of the fluid within the container with that within the measuring instrument. The device is also provided with means for dampening fluctuations of the pressure to which the contents of the container are subjected, so that when the pressure fluctuations occur at regular and relatively short intervals, the measuring means will be enabled to indicate the mean or average pressure.

Specifically describing the preferred embodiment of the invention, I have provided a housing 6 adapted to be coupled to the container, the pressure of whose contents it is desired to ascertain. Inasmuch as the preferred embodiment of the invention is designed to measure the pressure of fluid within a pipe line 7, I have found it expedient to form the housing of a relatively short length of pipe threaded at its lower end to be received within the side outlet 8 of a conventional T pipe fitting 9 which is adapted to be interposed within the pipe line 7, and thus establish communication between the interior of the pipe line 7 and interior of the housing 6.

The upper end of the housing 6 is closed in any suitable manner such as by a conventional cap 11, on the outer end of which a non-circular boss 12 is formed to facilitate the engagement of a wrench therewith in assembly and disassembly of the device.

A conduit 16 composed of upper and lower sections 17 and 18 respectively, extends loosely through a central bore 19 in the cap 11. The lower section 18 has a head 21 formed upon that end thereof which is within the housing 6, with an annular groove 22 formed upon the section 18 immediately adjacent the upper side of the head 21. A bulb 23 of impervious and flexible material such as rubber, is positioned upon the lower end of the section 18 of the conduit 16 by slipping the head 21 through an aperture 24 in the upper end of the bulb 23, the parts being so proportioned that the edges 26 of the aperture 24, seat within the annular groove 22. The upper face of the head 21 is provided with a circular depression 27 into which the material of the top of the bulb 23 is squeezed when the section 18 of the conduit 16 is forced upward so as to compress the top of the bulb 23 against the inner face 28 of the cap 11. For this purpose, threads 29 are formed upon the exterior of the section 18, for the reception of a nut 31 which bears against the top of the projection 12 so as to pull the section 18 upwards when the nut is tightened. It is readily apparent that the nut 31 may be tightened to such an extent that a tight seal is established between the bulb and the conduit 16, so as to prevent possibility of leakage of fluid from the housing 6 into the conduit 16. The tightness of this seal is enhanced by the fact that the top of the bulb is pressed into a depression 32 in the inner face 28 of the cap 11, which preferably conforms to the top of the bulb 23 as clearly shown upon Fig. 2.

The sections 17 and 18 of the conduit 16, are joined by a coupling 36 threaded to the upper section 17, and a sleeve 37 threaded to the coupling 36 and to the lower section 18. Any suitable pressure measuring instrument such as a pressure indicating gauge 38, is attached to the upper end of the section 17, with the result that communication is established between the interior of the bulb 23 and the pressure sensitive element of the gauge 38, it being understood that the coupling 36 is provided with a bore 39 establishing communication between the sections 17 and 18 of the conduit 16.

Means are provided for restricting the bore 39. Preferably the bore 39 is tapered, and has a tapered pin 41 fitted therein so as to effectually close all portions of the bore 39 except a relatively small passageway 42 which is formed by providing a relatively small groove 43 in the surface of the pin 47 and extending longitudinally thereof. It is obvious that the construction of the passageway 42 in this manner, is very much easier than constructing it by drilling a small hole through the center of the pin, inasmuch as the hole is so small for ordinary usages that an exceedingly small drill would have to be employed, rendering it very difficult to drill a hole of the proper diameter of any material length. In constructing the passageway 42 by means of a groove instead of a drilled hole, the pin 41 may be placed in a milling machine or shaper; and a groove 43 of definite predetermined proportions may be formed very quickly and easily.

It is obvious that a cylindrical pin 41 may be employed and fitted within a cylindrical bore of the coupling 36; but if these parts are tapered as described, they may be securely locked together simply by driving the pin 41 home sufficiently tightly, thus dispensing with the necessity of providing additional means for holding the pin 41 in place. The bulb 23, conduit 16, passageway 42, and the pressure sensitive portion of the gauge 38, are filled with any suitable non-compressible fluid such as water.

The manner of operation of the pressure measuring device of the present invention, is substantially as follows:

Assume that the pipe line 7 is carrying a fluid under relatively high and fluctuating pressure such as that to which circulation fluid is commonly subjected during deep well drilling. Owing to the flexibility of the bulb 23, this fluctuating pressure will be transmitted to the fluid inside the bulb, and inasmuch as a relatively large area of the bulb 23 is exposed to the pressure of the fluid within the conduit 7, very little of this pressure will be absorbed by the resilience of the bulb 23, with the result that the pressure of the fluid within the bulb 23 will at all times be substantially equal to that within the conduit 7, even though these two fluids are kept isolated. It is important to prevent intermingling of the fluid within the conduit 7 with that in the bulb 23, because of the fact that the fluid in the bulb 23 may thus be maintained relatively free of solid particles which might tend to interfere with the satisfactory operation of the gauge 38, or which might clog the restricted passageway 42.

Whereas the cross sectional area of the passageway 42 may be varied in accordance with the dictates of any particular installation, I have found that when relatively high pressures are being measured, say from two to three thousand pounds per square inch, and where the fluctuation of pressure ranges within the neighborhood of a thousand pounds per square inch, the cross sectional area of the passageway 42 should be only a few thousandths of a square inch. Thus the pressure of the fluid within the bulb 23 and the lower section 18 of the conduit 16, will be transmitted very slowly to the fluid within the upper section 17 of the conduit 16 and the gauge 38. If the pressure within the bulb 23 is altered and then permitted to stand for a prolonged period, the pressures within the upper and lower sections 17 and 18 respectively, will eventually become equalized; but when the pressure within the bulb 23 fluctuates with a relative degree of rapidity, the retardation or dampening effect of the restricted passageway 42 is to develop a mean or average pressure within the upper section 17 of the conduit.

In this manner, I have made it possible to accurately ascertain the effective or working pressure of the "mud" or fluid within the circulation system of deep well drilling apparatus, even though this fluid is subject to rapid and extremely violent pressure fluctuation. This determination of the effective pressure is not only accurate, but may be attained without imposing undue strain upon the gauge. Furthermore, owing to the fact that the restricted passageway 42 is of material length in contradistinction to a small hole drilled through a diaphragm, a greater resistance to the passage of fluid therethrough is offered, and the wearing of the walls of the passageway 42 is substantially eliminated, so that the results attained by the use of my apparatus, will be accurate over a prolonged length of time.

It is to be understood that the details of the invention as herein disclosed, are subject to alteration within the spirit or scope of the appended claims.

I claim:

1. A pressure measuring device comprising a housing adapted to contain a fluid under pressure, a conduit leading thereinto, a completely collapsible flexible bulb secured to said conduit within said housing, a fluid filling said bulb and conduit, and means for measuring the pressure of the fluid in the bulb and conduit.

2. A pressure measuring device comprising a housing adapted to contain a fluid under pressure, a conduit leading thereinto, a completely collapsible flexible bulb secured to said conduit within said housing, a fluid filling said bulb and conduit, means for establishing a tight seal between said bulb and conduit to isolate said fluids from each other, and means for measuring the pressure of the fluid in the bulb and conduit.

3. A pressure measuring device comprising a housing adapted to contain a fluid under fluctuating pressure, a conduit in communication therewith, pressure measuring means coupled to said conduit, a tubular coupling interposed in said conduit, and a pin seated within the bore of said coupling and defining a restricted passage therethrough.

4. A pressure measuring device comprising a housing adapted to contain a fluid under fluctuating pressure, a conduit in communication therewith, pressure measuring means coupled to said conduit, a tubular coupling interposed in said conduit, and a pin seated within the bore of said coupling and having a longitudinally extending groove in the surface thereof forming a restricted passage through the coupling.

5. A pressure measuring device comprising a housing adapted to contain a fluid under fluctuating pressure, a conduit in communication therewith, pressure measuring means coupled to said conduit, a tubular coupling interposed in said conduit, and a tapered pin seated within the bore of said coupling and defining a restricted passage therethrough.

6. A pressure measuring device comprising a housing adapted to contain a fluid under fluctuating pressure, a conduit in communication therewith, pressure measuring means coupled to said conduit, a tubular coupling interposed in said conduit, and a tapered pin seated within the bore of said coupling and having a longitudinally extending groove in the surface thereof forming a restricted passage through the coupling.

7. A pressure measuring device comprising a housing adapted to contain a fluid under fluctuating pressure, pressure measuring means coupled thereto, means isolating said fluid from said measuring means, and means for dampening fluctuations of pressure imposed upon said measuring means, said dampening means including a pin defining a restricted passage interposed between said measuring means and said isolating means.

8. A pressure measuring device comprising a housing adapted to contain a fluid under fluctuating pressure, a conduit in communication therewith, a flexible bulb secured to said conduit within the housing, a fluid filling said bulb and conduit, measuring means responsive to pressure fluctuations within said conduit, a tubular coupling interposed in said conduit between the housing and the measuring means, and means for restricting the bore of said coupling.

9. A pressure measuring device comprising a housing adapted to contain a fluid under fluctuating pressure, a conduit in communication therewith, a flexible bulb secured to said conduit within the housing, a fluid filling said bulb and conduit, measuring means responsive to pressure fluctuations within said conduit, a tubular coupling interposed in said conduit between the housing and the measuring means, and a pin seated within the bore of said coupling and having a longitudinal groove in the surface thereof forming a restricted passage through the coupling.

In testimony whereof I have signed my name to this specification.

OTTO B. GOLDMAN.